Oct. 21, 1947.  R. R. REYNOLDS  2,429,277
ESTIMATING INSTRUMENT
Filed March 19, 1945

Inventor
Reginald R. Reynolds

Patented Oct. 21, 1947

2,429,277

UNITED STATES PATENT OFFICE 2,429,277

ESTIMATING INSTRUMENT

Reginald R. Reynolds, Toronto, Ontario, Canada

Application March 19, 1945, Serial No. 583,619

3 Claims. (Cl. 235—83)

This invention relates to an instrument which may be used to calculate the estimated time which will be consumed by a certain defined unit, governed by variable conditions, to cover a defined distance, under assumed conditions, such as may be found relative to the movement of human beings or animals or of boats or other means of locomotion and the principal object of the invention is to provide a simple compact and easily operable instrument which may be used to add or subtract variables which would be a factor in the performance of the said unit and produce a fair estimate of performance.

The principal feature of the invention consists in providing an instrument with a dial chart having various circumferential time tables relative to various distances relating to the type of locomotion to be estimated and a rotatable indicator to be moved to selected positions on the chart, and arranging circumferential groups of tables or charts around the said time tables and providing a rotatable indicator to register with the outer tables or charts, the latter indicator being adapted to be brought into contact with the former indicator to move same relative to selected movements of the outer indicator.

In the accompanying drawing

Figure 1:
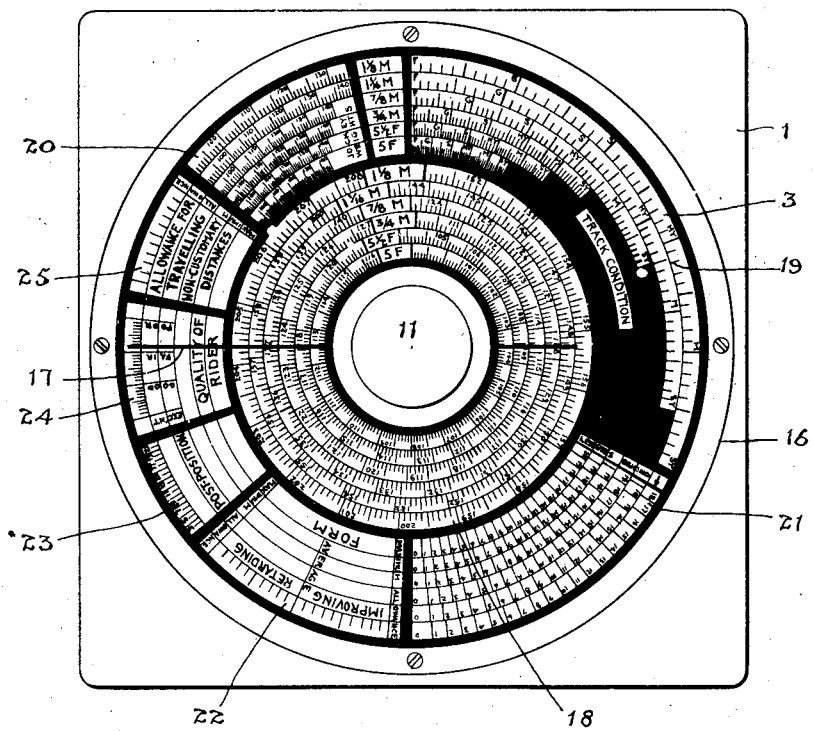
Figure 1 is a plan view of the instrument showing an arrangement of time and distance charts particularly applicable to the performance of race horses with surrounding charts and tables relative to variables affecting the speed of a horse for given distances.
Figure 2:
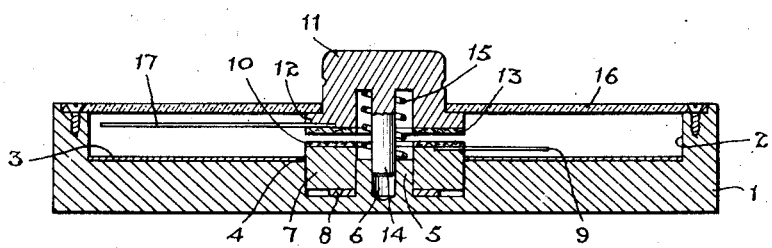
Figure 2 is a vertical mid-sectional view through the instrument.

The instrument as herein shown comprises a block 1 of suitable material having a circular recess 2 therein upon the bottom of which is mounted a chart 3.

A central annular recess 4 is formed in the chart and the block surrounding a central boss 5 which is shown provided with a central orifice 6.

Mounted in the recess 4 is a ring 7 which rotates freely around the central boss, being supported on an anti-friction washer 8. This ring is provided with a short indicating finger 9 which extends radially over the face of the chart 3. The upper surface of the ring 7 is provided with a suitable friction surface 10.

A knob 11 having a lateral flange 12 of substantially the same diameter as the ring 7 and provided with a friction face 13 adapted to engage the friction surface 10 of said ring is held in axial relation to the ring by a central pin 14 which extends into and rotates in the orifice 6.

A light coiled spring 15 surrounds the pin 14 and normally holds the flanged face of the knob 11 clear of the ring 7.

A transparent cover 16 encloses the recess 2 of the block and it is formed with a central orifice to permit the knob to extend thereabove so as to be readily moved by the fingers of the hand of the operator. This cover engages the upper edge of the flange 12 of the knob and limits its upward movement.

An indicator finger 17 of greater length than the finger 9 on the ring 7 extends radially from the flange of the knob 11.

The chart 3 herein shown is provided with a plurality of concentric circular areas 18 which are marked respectively 5F; 5½F: ¾M: ⅞M; 1¹⁄₁₆M and 1⅛M to indicate respectively 5, 5½ furlongs, ¾, ⅞, 1¹⁄₁₆ and 1⅛ miles, and each area is divided by radial scale markings and numerals to indicate a wide range of time periods and their divisions in which the distance indicated may be travelled.

The short indicator finger 9 extends to the outermost of these scales.

Surrounding the time distance scales are various areas indicating variables which may affect the speed of locomotion. The area 19 represents a scale of "track condition" and this is divided into concentric areas representing distances corresponding with the distances marked in the area 18. These various distance areas are divided by radial scale markings and track indication marks are arranged thereon representing F, fast; G good, S slow etc. An area 20 adjacent to the area 19 is divided with scales to represent various "weights carried." Another area 21 represents "lengths behind" which a certain horse may be known to have been in a previous race.

Other areas 22 represent "form" of the performer which may be "improving" or "retarding"; 23 represents "post position" that the performer occupied in a previous race; 24 "quality of rider" and 25 "allowance for travelling" of the performer prior to the race. All of these charts represent variables which may affect a future performance.

In utilizing this instrument, the operator will first set the short indicator 9, by pressing the knob 11 to engage and turn the ring 7, so that said indicator will register with the time performance in the last performance of a certain performer.

The knob is then released from contact with the ring 7 and it is then turned without moving said ring so that the pointer 17 registers with a known condition of the last race performed such as "track condition" whether "fast," "good," etc., and the knob is then pressed down to engage the ring 7 and while thus in contact the pointer 17 is moved to the "present" or "to-day's" condition and in being thus moved the ring 7 and its pointer 9 is turned with it, either forward or backward, that is to say, if the performer in his last performance travelled 1⅛ miles in 1:55 and a fraction on a slow track, the pointer 9 is first moved to the proper point 1:55+, then pointer 17 is moved free, to the scale marking "slow" on the "track condition" scale. The knob is then pressed to engage the ring 7 and both members are turned till the pointer 17 is moved to "to-day's" track condition, say "good" and the pointer 9 will be moved back on the time chart a distance relative to the movement of pointer 17 from "slow" to "good."

Also "weights carried" and the other variables will be treated in a like manner, retarding or advancing the short pointer 9 over its time scale and when all variables have thus been treated, always moving the pointer 17 and the pointer 9 with it, from the "condition" of the previous performance to the present "condition," the final result as indicated by the pointer 9 will give a fairly accurate estimate of the time the performer may cover the given distance under "to-day's" conditions.

The device is extremely simple in its construction and operation and it will be readily understood that the construction may be varied considerably as also the chart may be varied to suit various unit performances without departing from the principle of the invention.

The instrument has been described specifically as applied to estimating race probabilities but it will be understood that a scale may be used which will provide stable and variable conditions respecting numerous features or conditions which it may be desired to estimate, such for instance as applying the instrument to estimating weather forecasts or for the estimating of life expectancy.

What I claim as my invention is:

1. An estimating instrument comprising a block having a central circular recess of large diameter, a central annular recess of small diameter, a circular chart inset in said circular recess, an annular member carrying a pointer mounted in said annular recess, a circular member carrying a pointer rotatably mounted on said block co-axially with but not engaging said annular member, said circular member being adapted to be forced into frictional engagement with said annular member whereby the rotation of the latter may be effected upon rotation of the former.

2. An estimating instrument comprising a block having a central circular recess of large diameter, a central annular recess of small diameter forming a central boss, an orifice in the centre of said boss, a circular chart inset in said circular recess, an annular member carrying a pointer mounted in said annular recess, a spindle carrying a circular member provided with a pointer slidably and rotatably mounted in said orifice, a coil spring on said spindle to keep said circular member normally out of engagement with said annular member, said circular member being adapted upon pressure to engage said annular member whereby the rotation of the latter may be effected upon rotation of the former.

3. A device as claimed in claim 1 wherein the circular chart comprises a plurality of concentric annular areas representing various distances of travel and divided circumferentially by radial scale markings representing time consumed in travel and co-operating with the first-mentioned pointer, a plurality of scale areas concentric with the aforesaid areas and divided circumferentially by radial scale markings representing variable conditions affecting travel and co-operating with the second-mentioned pointer.

REGINALD R. REYNOLDS.

REFERENCES CITED

The following references are of record in the file of this patent:

UNITED STATES PATENTS

| Number | Name | Date |
|---|---|---|
| 1,407,987 | Crane | Feb. 28, 1922 |
| 2,177,176 | Gilmore | Oct. 24, 1939 |
| 2,268,886 | McNamara | Jan. 6, 1942 |
| 2,283,799 | Favalora | May 19, 1942 |

FOREIGN PATENTS

| Number | Country | Date |
|---|---|---|
| 136,182 | Great Britain | Jan. 8, 1920 |